United States Patent
Gunn

[19]

[11] Patent Number: 5,878,561
[45] Date of Patent: Mar. 9, 1999

[54] ROW CROP HARVESTER

[76] Inventor: Ira I. Gunn, 196 Gunn Dr., Huntsville, Ala. 35803

[21] Appl. No.: 740,643

[22] Filed: Oct. 31, 1996

[51] Int. Cl.$^6$ ............................. A01D 45/02; A01D 61/04
[52] U.S. Cl. .......................... 56/98; 56/75; 56/82; 56/119
[58] Field of Search ................................. 56/98, 28, 59, 56/66, 69, 75, 78, 82, 88, 93, 105, 106, 107, 108, 111, 118, 73, 80, 84, 74, 81, 86, 119

[56] References Cited

U.S. PATENT DOCUMENTS

| | | |
|---|---|---|
| 3,736,733 | 6/1973 | Fell et al. . |
| 3,759,021 | 9/1973 | Schreiner . |
| 3,807,152 | 4/1974 | Storm et al. . |
| 3,808,783 | 5/1974 | Sutherland et al. . |
| 4,083,167 | 4/1978 | Lindblom et al. . |
| 4,106,270 | 8/1978 | Weigand et al. . |
| 4,160,355 | 7/1979 | Blake et al. . |
| 4,227,366 | 10/1980 | Pucher . |
| 4,259,831 | 4/1981 | Jerke et al. ............................. 56/106 X |
| 4,269,017 | 5/1981 | deBuhr et al. ............................. 56/106 |
| 4,397,134 | 8/1983 | Lausch et al. . |
| 4,403,467 | 9/1983 | Baugh . |
| 4,493,181 | 1/1985 | Glendenning et al. . |
| 4,538,404 | 9/1985 | Heimark, Jr. et al. . |
| 4,553,379 | 11/1985 | Kalverkamp . |
| 4,567,717 | 2/1986 | Manton . |
| 4,700,537 | 10/1987 | Emmert . |
| 5,060,464 | 10/1991 | Caron . |
| 5,195,309 | 3/1993 | Mossman . |
| 5,444,968 | 8/1995 | Barton . |

*Primary Examiner*—Terry Lee Melius
*Attorney, Agent, or Firm*—Shook, Hardy & Bacon L.L.P.

[57] ABSTRACT

A row crop harvesting device for mounting on the forward end of a combine, the row crop harvesting unit having closely spaced individual row harvesting units to facilitate retrieval of downed crop and use on closely-spaced crops. The present invention is particularly applicable to corn harvesting units that include a gear housing which is part of and supports the individual row harvesting units, which individual row harvesting units are adjustable transverse to the forward end of the combine to allow adjustment for crop row spacing. The present invention allows closer spacing of the individual row harvesting units by offsetting certain components of the row harvesting units on alternate row harvesting units.

8 Claims, 7 Drawing Sheets

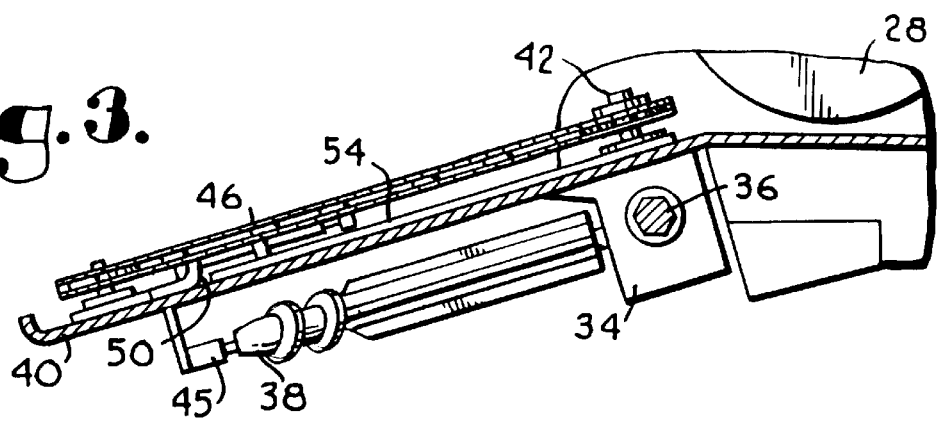
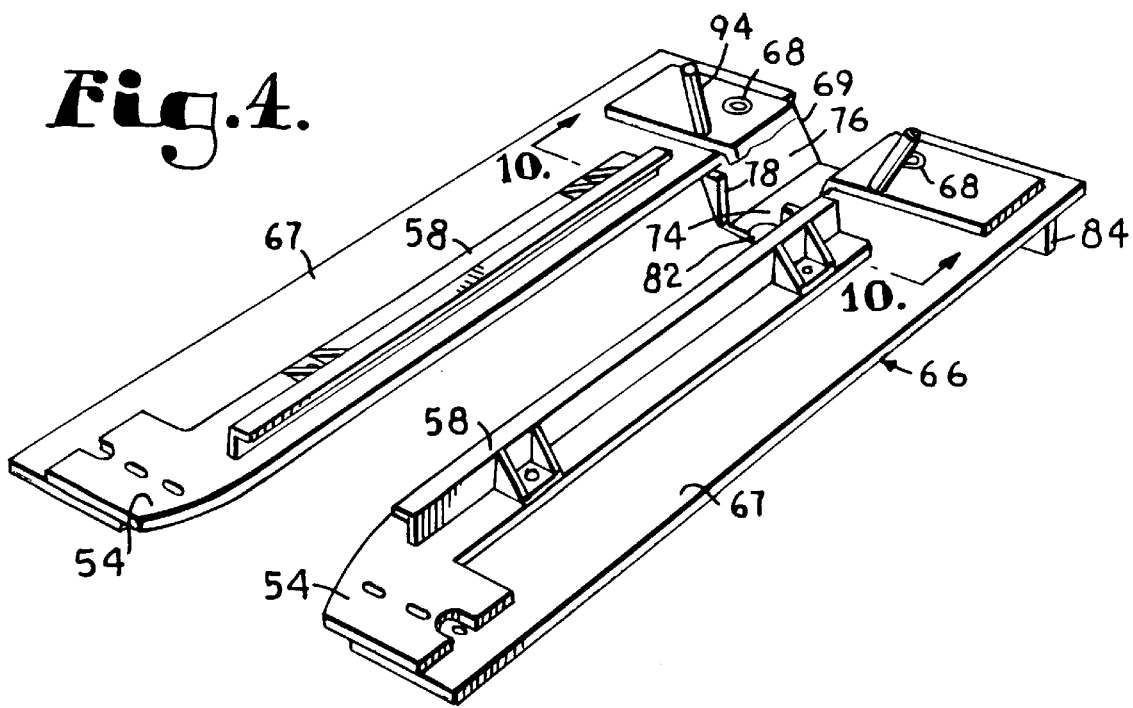

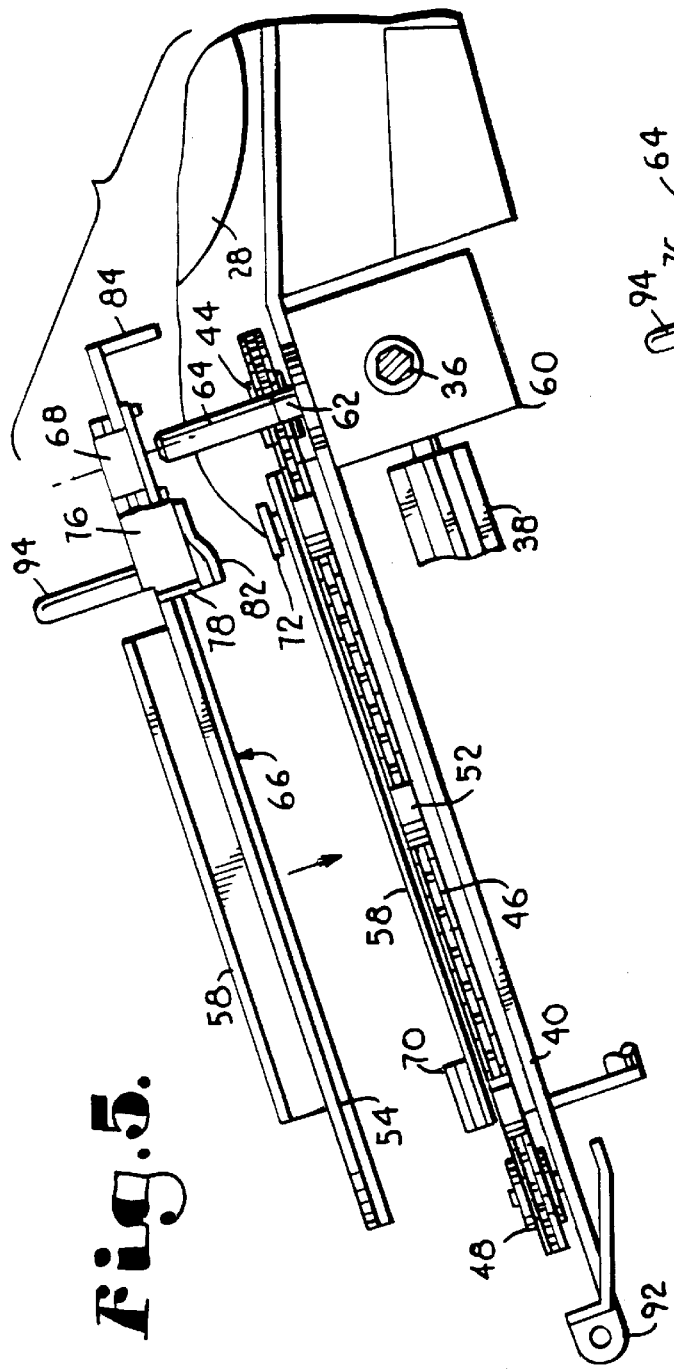
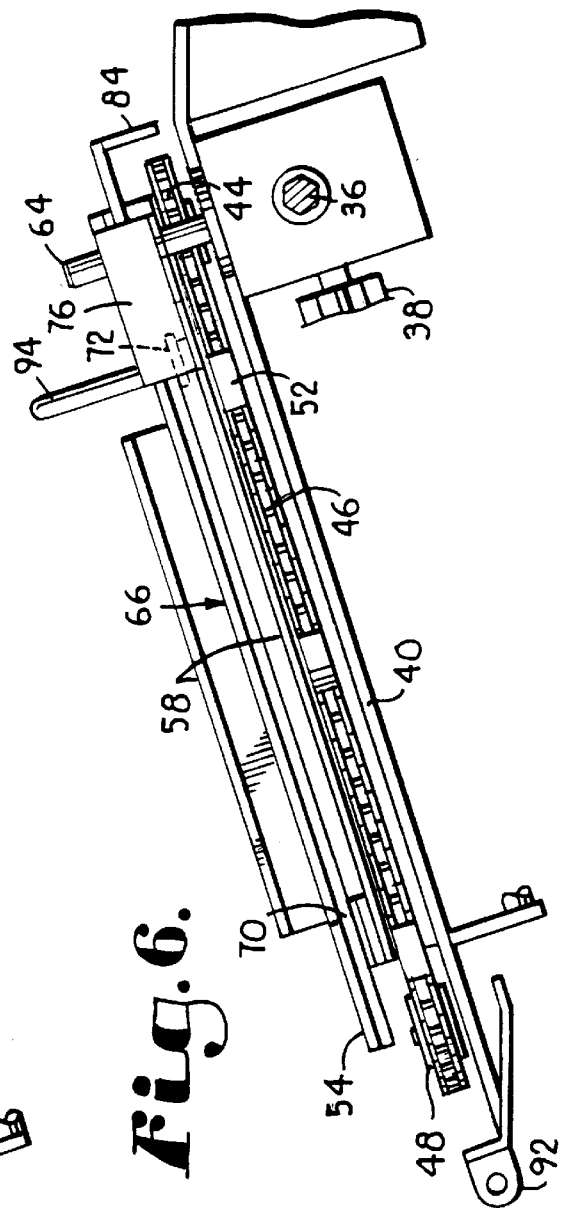

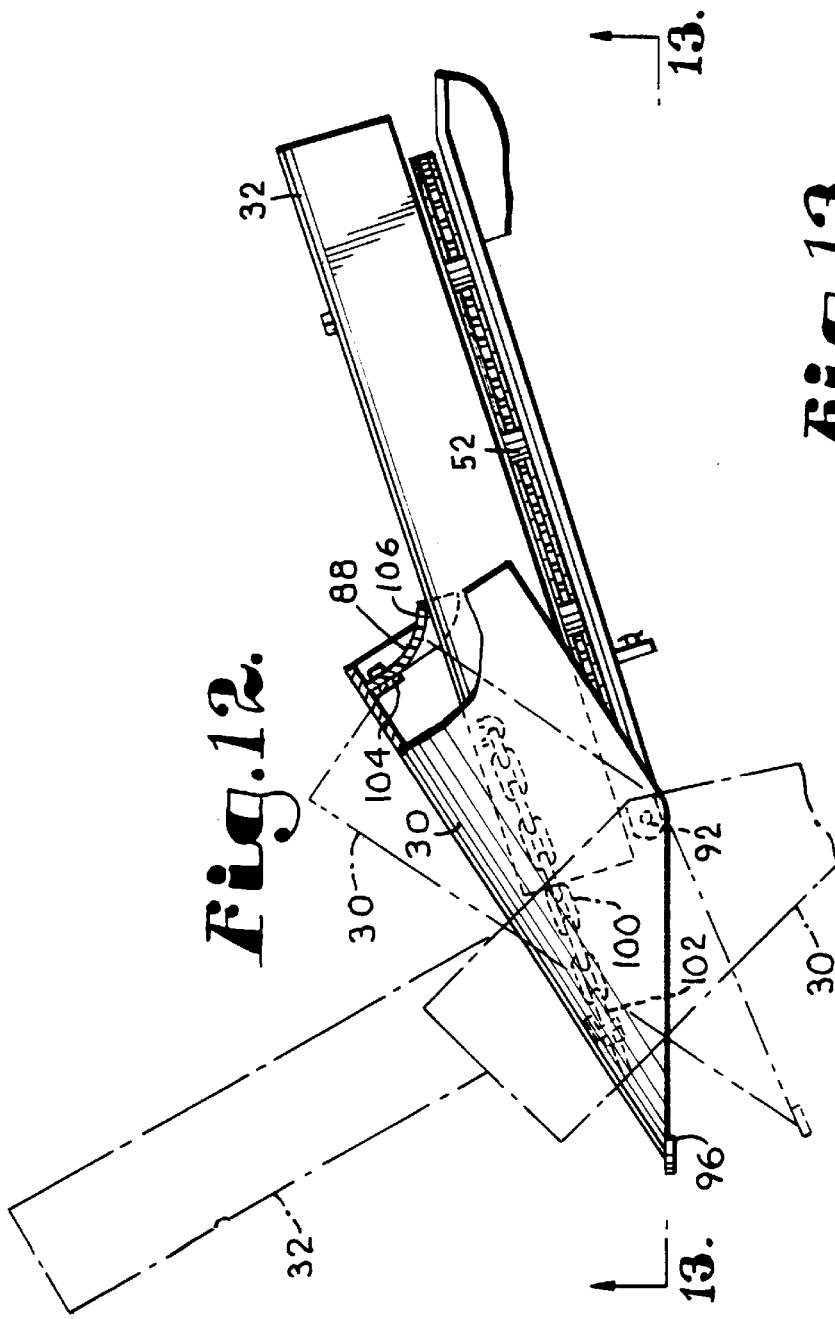
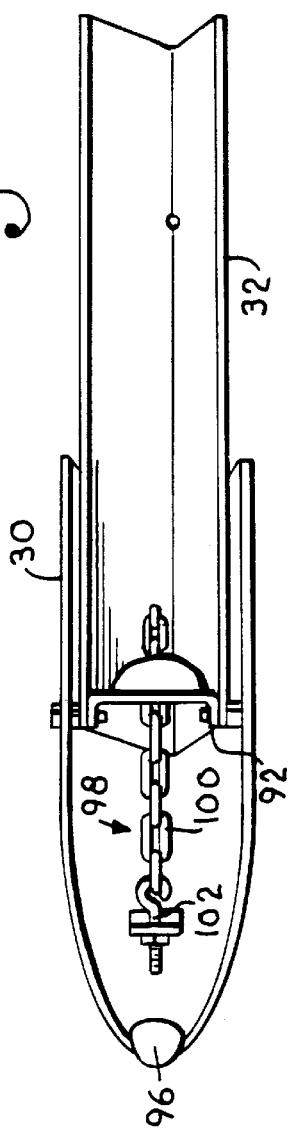

ROW CROP HARVESTER

BACKGROUND OF INVENTION

This invention relates to a row crop harvester adapted to be mounted on the forward end of a combine or similar mechanized harvesting machine. More particularly, the invention relates to a row crop harvester with increased density of individual harvesting units on the structure to facilitate increased percentage of recovery of crop from down crops and the like, and, also to enable effective harvesting of closely-planted rows of crops.

Agricultural harvesting machines, such as combines, are fitted on their forward end with a variety of row crop harvesting devices or headers, such as a corn head. A typical row crop harvester, comprises a plurality of individual row harvesting units (row units) each separated by a plurality of row crop dividers. As the combine moves through a field planted with a row crop, adjacent crop dividers define areas into which the crop being harvested is drawn by a gathering structure associated with each of the individual row units. The gathering structures typically comprise gathering chains or serpentine gathering belts to urge the crop further into the individual row units where a cutting mechanism or snapping rollers separate the desirable portion of the crop from other portions of the plant. The harvested crop is urged rearward toward the combine by action of the combine moving forward through the crop and the motion of the gathering chains urging the crop rearwardly toward a laterally disposed auger, which further urges the crop toward the intake to the separator portion of the combine. Typical row crop header units are disclosed in U.S. Pat. Nos. 3,808,783 and 3,759,021, each of which is incorporated herein by reference. A variety of row crop dividers also exist, such as those disclosed in U.S. Pat. No. 5,195,309, which is incorporated herein by reference.

For discussion purposes, features of the corn head will be examined, although it will be apparent that features of this invention are applicable to other crops. Individual corn collecting units (referred to herein as row units or harvesting units), such as those in a 40 Series John Deere corn head, typically comprise a pair of gathering chains, each chain disposed around a rearward chain gear drive and a forward idler chain gear. The chains extend forwardly from the platform of the combine and are configured in the same plane to form generally parallel lines of chains arranged to urge cornstalks rearwardly into the header. Located immediately below the gathering chains is a pair of snap rollers, configured to pull corn plants downwardly between the rollers so as to separate corn ears from the corn stalks. The individual row units are mounted to the frame of the header and typically are driven from a common power shaft that extends parallel to the header auger. Historically, harvesting units have been set up to be, within certain limits, adjustable so that the individual row units can be located to take best advantage of the crop row placement in the field. Generally, the row units are arranged so that each row unit is dedicated to each row of crop. In the past, typically the corn crop row spacing has been kept at nominally 30 inches between rows. This allowed for pest and weed control and provided optimal growing conditions for the cultivars available.

More recent developments in seed technology, fertilizer availabilities, pest and weed control are allowing corn crops to be planted in narrower rows to make better use of the available farmland. These rows have become as narrow as 15 inches. Traditional corn harvesting equipment cannot generally be adjusted to accommodate these narrower rows, however. The typical problem involved is that the return side of the gathering chains of adjacent individual row units interfere with each other when the units are placed in close proximity, generally preventing placement significantly closer than 30 inch spacing.

In addition, the close spacing of individual row units facilitates lifting and retrieval of downed crops. Generally, corn and similar crops are allowed to dry for a period of time in the fields prior to harvesting to minimize crop damage due to spoilage and the need for mechanical drying. However, late season storms can topple portions of the crop creating what is called a "downed crop" condition. In this instance, the individual stalks of corn are lying across the rows and entangled with one another. Further, the stalk can be essentially lying on the ground. A typical wide row harvester approaching a downed crop has a tendency to lift portions of the downed crop with the stalk upside down in an inverted U-shape such that, when pulled into the widely spaced crop gathering units, the ears of the plant pass below the snap rollers and are forced down with the rejected silage, thus reducing an ultimate crop yield. Narrower spacing of the individual crop units tends to lift the downed crop in a configuration which is less likely to reject useful ears of corn. Further, the narrow spacing ensures more structures for picking the corn ears so that the random nature of the downed crop can be more easily dealt with.

SUMMARY OF THE INVENTION

One object of the present invention is to provide a crop gathering device such as a corn harvester in which the individual harvesting units may be adjusted to accommodate narrow crop row spacing to maximize crop harvest.

Another object of the present invention is to provide a crop gathering device that reduces harvesting losses, especially in the case of downed crops, utilizing narrowly spaced individual harvesting units.

A still further object of the present invention is to provide the harvesting device with enhanced crop row dividers which will allow for increased density of crop row spacing and maximize maintainability of the individual crop harvesting units.

These and other objects of the invention will be made clear from the following description, drawings and claims.

The present invention is directed to a row crop harvesting device mounted on the front of and powered by a combine or the like. The device includes a frame mounted on the combine and a plurality of individual row units mounted in a side by side relation on such frame. The individual row units include forwardly directed crop gathering structure and separating structure for recollecting the ear part of the crop and discarding unwanted portions of the crop. The individual row units are of a first type or a second type. The first type of row units is vertically offset from adjacent second type row units so as to allow the row units to be placed in a closer side by side relationship than is possible with a harvesting device having a plurality of identical units all on the same vertical level. Generally, the offset portions of the individual row units are the gathering structures of the units because those portions of the individual row units are the widest portions of those units. The present invention also includes new crop row dividers that urge the crop into the row units. The new dividers are hingeably connected to the individual row units for ease of maintenance. Further, the dividers preferably extend only a minimum distance in front of the gathering chain, so as to minimize the distance a crop must travel between first contacting the divider and contacting the gathering structure, and, thus, reducing the probability that a crop is lost prior to contacting the gathering structure.

BRIEF DESCRIPTION OF THE DRAWINGS

In the accompanying drawings which form a part of the specification and are to be read in conjunction therewith and in which like reference numerals are used to indicate like parts in various views:

FIG. 3 is a detailed cross-sectional view taken generally along line 3—3 of FIG. 2;

FIG. 4 is a top perspective view of a deck assembly of the present invention;

FIG. 5 is a partially exploded side elevation view taken generally along line 5—5 of FIG. 7 showing a raised deck of a second type row unit positioned above an individual row unit of a first type;

FIG. 6 is a view similar to FIG. 5 showing a raised deck of a second type individual row unit supported in its operating position above a first type individual row unit assembly, the gears, gathering chains and tensioning structure not yet attached to the deck;

FIG. 12 is a detailed cross-sectional view taken generally along line 12—12 of FIG. 11 and showing details of a crop row divider of the present invention;

FIG. 13 is a detailed section view taken generally along line 13—13 of FIG. 12;

DETAILED DESCRIPTION OF THE INVENTION

Figure 1:
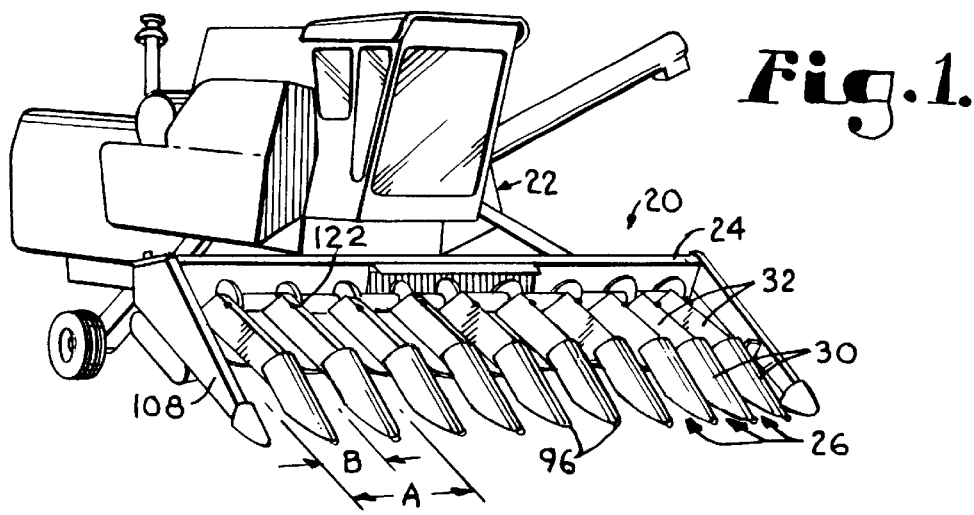
FIG. 1 is a front perspective view of a combine with a row crop harvester attached incorporating the present invention.
Figure 7:
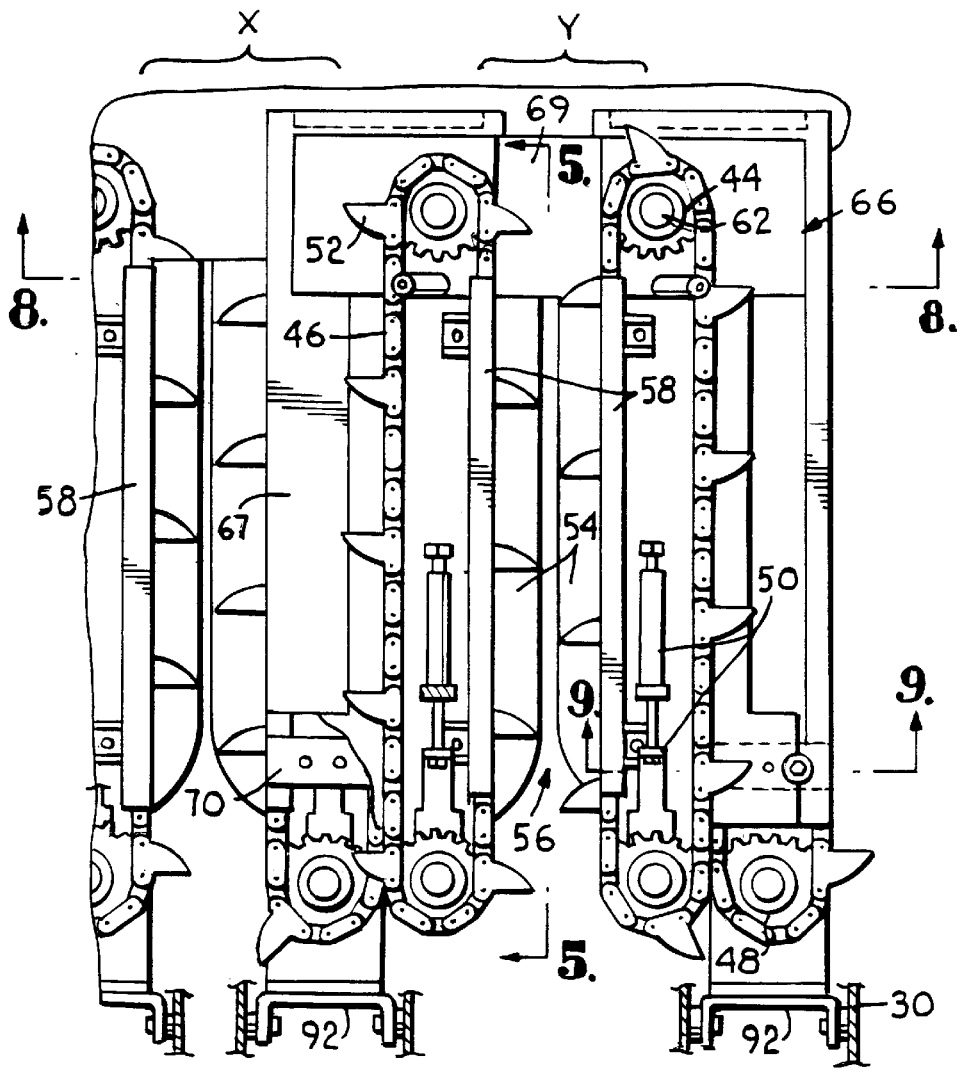
FIG. 7 is a fragmentary top plan view similar to FIG. 2 showing an assembled corn harvesting unit of the present invention with the row crop dividers removed.
Figure 11:
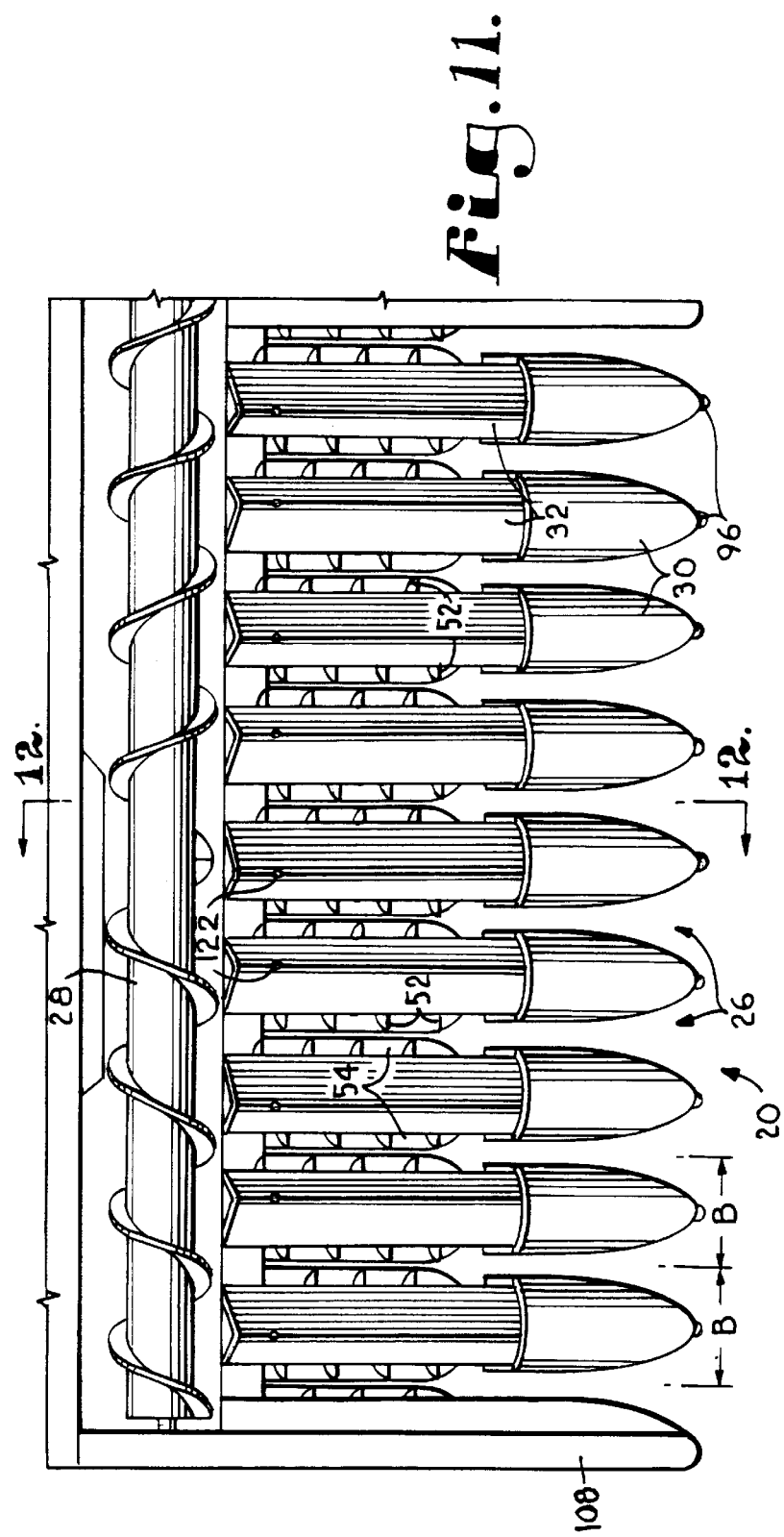
FIG. 11 is a top plan view of the harvester of FIG. 1 showing an assembled corn harvesting unit of the present invention.

Referring to FIG. 1, a corn harvester head 20 incorporating the present invention is shown attached to the forward end of a combine 22. Corn harvester head 20 includes a frame or platform 24 to provide an attachment point for various individual row units 26. As on other harvesting units of this general type, individual row units 26 are adjustable along frame 24. Particular accommodations provided for this adjustment are well-known in the art and may be embodied in a variety of fashions. One such arrangement is shown and described in U.S. Pat. No. 3,759,021. FIGS. 1 and 11 show a corn harvesting head with ten individual row units 26 set with the center lines of the unit a dimension B apart. Rearward of the individual row units is an auger 28 for moving harvested ears to a center intake (not shown) for transference to the separator portion of the combine. FIG. 11 shows individual row units 26 with snooters 30 and gatherer chain shields 32 which serve to cover portions of the individual harvesting units 26 as will be more fully described below. FIG. 7 shows two individual harvesting units 26 with snooters 30 and gatherer chain shields 32 removed. As will be explained further below, these two gathering units have a majority of parts in common. However, to allow the gathering units to overlap as shown in FIG. 7, portions of a second type of row unit designated Y in FIG. 7 are elevated vertically above similar portions of a first type of row unit designated X. Prior art corn harvesters typically have only one type of row unit (the X type). Therefore, all the row units of prior art corn harvesters are on the same level, thus limiting the amount the dimension B may be reduced due to interference of the row unit mechanisms.

Figure 8:
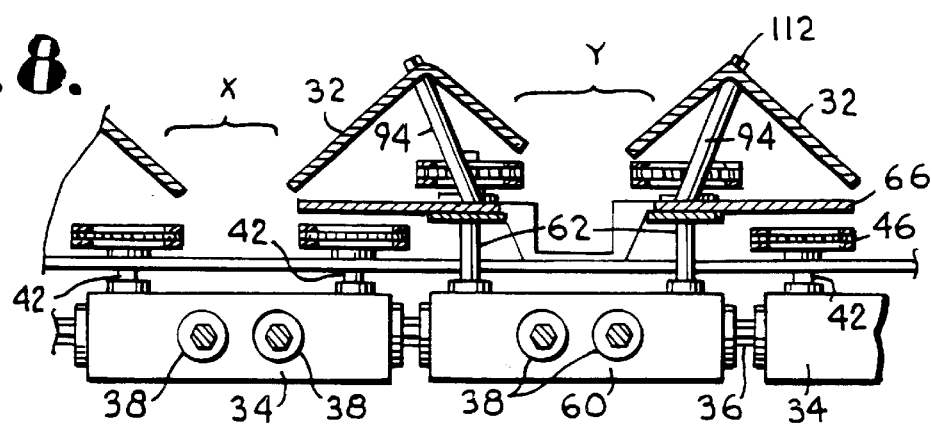
FIG. 8 is a cross-sectional view taken along line 8—8 of FIG. 7, and showing chain covers in place and intermediate gear cases positioned between existing gear cases on a drive shaft.

Beginning with an individual row unit X, as may be best seen by reference to FIG. 3, each individual row unit is connected to and mounts upon a row unit gear case 34 which is attached to corn harvester frame 24 through conventional means. As best shown in FIG. 8, power is supplied to a plurality of row unit gear cases 34 through an elongated drive shaft 36 in a manner that is well-known in the art. Attached to and driven by each gear case 34 are a pair of stalk or snap rollers 38 which can best be seen in FIG. 3. Further, each row unit X has a frame 40 attached to an associated gear case 34. As best seen in FIG. 3, the frame 40 is mounted above and disposed generally parallel to each pair of stalk rollers 38. The frame 40 has a center slot 41 through which stalks are conveyed. Because of slot 41, each frame 40 has two leg sections 43. Extending inwardly from each leg 43 is a trash knife 45. Trash knives 45 extend the length of stalk rollers 38 and serve to prevent debris from being tangled about the rollers in a well-known manner.

Figure 2:
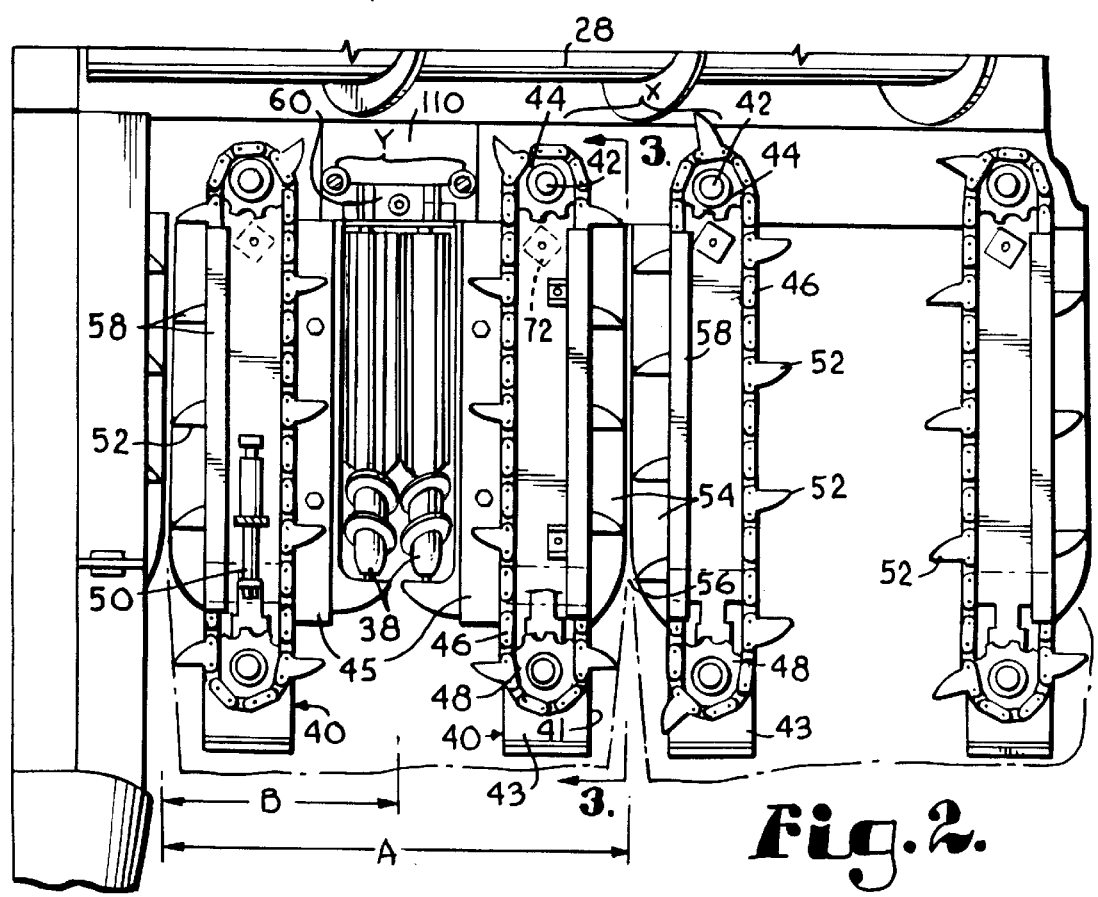
FIG. 2 is a fragmentary top plan view of an individual row unit of the harvester of FIG. 1 with the crop row divider removed and further showing the positioning of an intermediate gear case and stalk rollers between existing row units.

Protruding upwardly through each roll unit frame 40 are a pair of gathering chain drive gear drive shafts 42 which extend upwardly from and are rotated by the internal gearing structure of gear case 34, as best shown in FIGS. 2 and 3. More specifically, each shaft 42 protrudes through the roll unit frame 40 to drive a chain drive gear 44. Extending parallel to the frame 40 and to each other are a pair of gathering chains 46 which loop around idler gears 48, as best shown in FIG. 2. Idler gears 48 are connected to tensioning mechanism 50 for adjusting and maintaining the tension in the chains 46 in a well known manner. Each chain 46 also has a plurality of spaced flights 52 which serve to urge corn stalks into the corn head. Referring to FIGS. 2 and 3, a pair of deck plates 54 are mounted to each roll unit frame 40 on opposite sides of slot 41. A narrow throat area 56 is formed by the pair of plates 54 and a gathering chain 46 is positioned on each side of area 56. Further, disposed along each side of throat area 56 are chain guides 58 for maintaining the orientation of gathering chains 46 in operation.

Referring to FIGS. 4–10, similar to X-type units, individual row units designated Y are connected to and mounted above intermediate row unit gear cases 60 which are attached to the corn harvester frame 24 in the same manner as gear cases 34. These intermediate gear cases 60 are positioned between the typical gear cases 34 and provide the narrow row spacing of the present invention as best shown in FIGS. 2 and 8. Power is supplied to gear case 60 through drive shaft 36. Attached to and driven by each gear case 60 are a pair of stalk rollers 38. As best seen in FIG. 8, each gear case 60 and attached rollers 38 is mounted between two adjacent roll unit frames 40. As best shown in FIGS. 5, 6, and 8, protruding upwardly from each case 60 are a pair of gathering chain drive gear drive shafts 62 which are rotated by gear case 60 in the same manner shafts 42 are rotated by cases 34. Each chain drive shaft 62 protrudes above the adjacent roll unit frame 40 as best shown in FIG. 5. It may even be necessary to produce a notch or slot in each frame 40 to allow shaft 62 to extend above it. Each shaft 62 includes an extension portion 64 to extend shafts 62 through a raised deck assembly 66 which is elevated above and parallel to the adjacent roll unit frames 40 as best shown in FIGS. 5, 6 and 8. Deck 66 includes parallel leg sections 67 which are connected by a throat plate 69. Portion 64 of shafts 62 are preferably guided by guide bearings 68 suitably mounted in the raised deck assembly 66 by a flange structure. Each deck 66 has deck plates 54, chain guides 58, gathering chain drive gears 44, gathering chains 46, idler gears 48, and tensioning structure 50 attached thereto (as best shown in FIGS. 4 and 7), thus elevating those components above those on units X. The extension portions 64 of shafts 62 protrude through deck 60 to drive gear 44. Extending parallel to the raised deck assembly 60 and to each other are chains 46 which loop around idler gears 48. Idler gears 48 are connected to tensioning structure 50 for tensioning the chains 46. Referring to FIGS. 4 and 7, deck plates 54 are mounted onto raised deck assembly 66 and define a narrow throat area 56 on each side of which a gathering chain 46 is positioned. Disposed along each side of area 56 are chain guides 58 for maintaining the orientation of chains 46 in operation.

As seen in FIGS. 6 and 7, each deck assembly 66 is supported by the adjacent roll unit frames 40. More specifically, each section 67 of a deck 66 overlays at least partially a portion of the adjacent frame 40 and the chain gathering structure thereon. Spacers 70 and 72 are used to raise the bottom of sections 67 above the gathering structure as best shown in FIG. 6. Raised deck assembly 66 is affixed to the spacers 70 and 72 by conventional means such as bolts or the like. For instance, the same bolts used to attach tensioning mechanism 50 to frame 40 can be used to secure each section 67 to its associated frame 40 and thus secure deck 66 in place. At the rearward portion of the deck 66 (the portion nearest the combine), throat plate 69 is configured to allow passage of harvested crop to auger 28.

Figure 10:
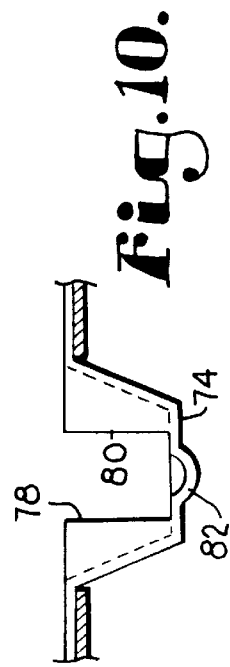
FIG. 10 is a cross-sectional view taken generally along line 10—10 of FIG. 4.
Figure 9:
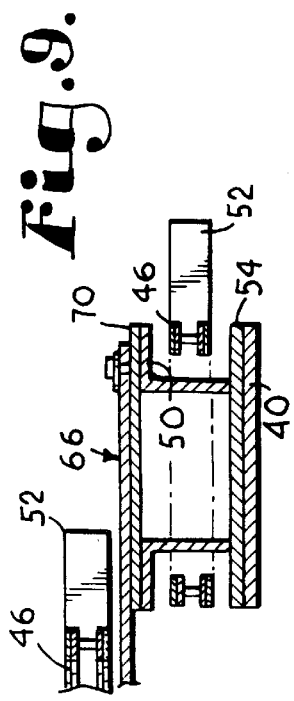
FIG. 9 is a cross-sectional view taken generally along line 9—9 of FIG. 7 and showing the deck assembly of a second type unit positioned above a first type unit.

Throat plate 69 includes generally horizontal bottom plate 74 and a pair of sloped side plates 76 connecting plate 74 to sections 67 as best shown in FIG. 4. Each side plate 76 has a planar member 78 extending inwardly from its forward edge. Members 78 form a slot 80 therebetween as best shown in FIG. 10. Plate 74 has an indentation 82 formed directly below slot 80. Indentation 82 is preferably approximately ¾ inches deep and 1½ inches long. The provision of slot 80 in combination with indentation 82 has been found through extensive field testing and research to aid the clean delivery of corn ears to auger 28 by eliminating clogging in this area. Each section 67 also has an ear guard 84 extending downwardly therefrom adjacent its rear edge as best shown in FIG. 4. These ear guards 84 keep ears of corn from falling beneath deck 66.

In order to take best advantage of the more closely spaced individual crop row units, a crop row divider system including a snooter 30, ear saver 88, and chain shield 32 are preferably arranged as described herein. Referring to FIGS. 5, 7 and 13, a hinge plate 92 is mounted at the forward end of each leg 43 of each row unit frame 40. As seen to advantage in FIGS. 12 and 13, each hinge plate 92 is pivotally connected to a snooter 30 and a chain shield 32 to allow both mechanisms to be rotated around a common point for ease of maintenance. Shield 32 is pivotally supported at its forward end at the aforementioned hinge plate 92. As also seen in FIGS. 4 and 8, the rearward portions of shields 32 are supported by attaching posts 94 that extend upwardly from raised decks 66. Preferably, this attachment point is a removable fastener such as a bolt or the like to enable ease of detachment for maintenance. As best seen in FIG. 8, shield 32 is a V-shaped plate with one leg of the "V" shorter than the other. The shorter leg is arranged to provide covering for the raised gatherer chain above the raised deck on the Y-type row crop units. The longer leg of the "V" is then provided to form a slope toward the lower X-type row crop units. The "V" is at about an 80 to 90 degree angle, forming two approximately 40 to 45 degree angles, one on each side of the "V." The angle is shaped to provide a means to urge crops back toward gatherer chains 46 if the crops lay across the top of shield 90.

As noted above, snooter 30 is also connected at an intermediate portion thereof to common hinge plate 92. Snooter 30 projects forwardly from hinge plate 92 and forms a blunted point end at the most forwardly projecting portions of harvesting head 20. The length of snooter 30 from hinge plate 22 to the forward tip thereof is preferably about 20 inches. This allows a steep angle to be formed between snooter 30 and the ground to enhance lifting of downed crops. On the most forward tip of snooter 30 preferably is a skid plate 96 for absorbing wear from ground contact. An adjusting mechanism 98 is provided to limit the downward travel of the forward tip of the snooter. A preferable arrangement of this adjusting mechanism is shown in FIGS. 12 and 13, and consists of a chain 100 affixed at one end to a portion of shield 32 near the forward end thereof, with the other end of chain 100 affixed to the forward portion of snooter 30. When tension is applied to this chain, it prevents the snooter from rotating downward at the forward tip thereof. A fine adjusting mechanism 102 may be provided such as a threaded bolt connection or the like to hold one end of the chain.

As best seen in FIG. 12, on the rearward portion of snooter 30 is located ear saver device 88, which is a sheet to prevent harvested ears from sliding forwardly down shield 32 and under snooter 32 and being lost back into the field. Ear saver 88 forms a shield on the underside of the rearward edge of snooter 30 to close off the area between snooter 30 and shield 32. Preferably, ear saver 88 is formed partially of a metal sheet 104 and partially of a flexible ear saver skirt 106. Skirt 106 is preferably applied to the lower portion of sheet 104 such that it contacts shield 32. This ear saver skirt is preferably a flexible rubber or a plastic material and is arranged so that it applies an upward force to the rearward edge of snooter 30 as skirt 106 is compressed against chain shield 32. This acts to urge the forward tip of snooter 30 in a downwardly direction in opposition to snooter adjusting mechanism 98. This acts to maintain the forward portion of snooter 30 in contact with the ground as corn harvester 20 is pushed through the field on a combine 22 or the like. The surface of snooter 30 and shield 32 may also be corrugated with corrugations running from forwardly to rearwardly along snooter 30 to reduce friction of corn stalks sliding over snooter 30. These corrugations will help reduce pluggage caused from wet crops sticking to the snooter and shield. Such corrugations would be nominally one-quarter inch or smaller corrugations spaced from about ¾ to 1¼ inches apart. The outer gatherer shields 108, see FIG. 1, are arranged similar to the shield and snooters in that they are hingably attached at the forward ends and sized to provide for the narrower rows of the present invention.

The corn harvester acts in operation generally like other corn harvesters in that as the combine 22 moves forwardly through a field to be picked, harvester 20 is placed so that rows of corn will move between the crop row dividers toward individual row units 26. As the stalks of corn approach gatherer chains 46, the chains urge the stalks rearward toward stalk rollers 38. As the stalks engage stalk rollers 38, which are powered by gear cases 34 and 60, the stalks are urged in a downwardly direction between the stalk rollers. The stalks are also pulled between deck plates 54 which are set at such a distance so as to prohibit passage of the ears of corn. Thus, ears of corn are pulled off of the stalks as the stalks are pulled downwardly through stalk rollers 38. Movement of the combine forwardly through the field and the crop being urged rearwardly in the corn harvester 20 urges the ears of corn rearwardly toward auger 28 where they are gathered at a central point and moved through the combine by conventional means. As seen in FIG. 2, trash knives 45 are located on the outside edge of stalk rollers 38 to prevent the upwardly turning of the outer edges of stalk rollers 38 from lifting unwanted material upwardly.

The present invention, due to the more closely spaced individual row units 26, tends to provide more opportunities for a downed crop to be urged into the gathering chains 46. Basically, the additional row units provide additional gathering points which are located between the traditional spacing of the corn rows. Referring to FIG. 1, typical spacing on an existing corn harvester would be shown as a dimension A between the harvesting units. This would be normally about 30 inches between rows, which is the common traditional spacing for corn rows. The dimension B shown is half of the dimension A, thus providing twice the number of gathering units in the present invention as in a normally spaced prior art corn harvester.

The present invention is also adopted to modify existing row crop harvesting machines, such as a John Deere Series 40 corn-picking head, manufactured by Deere and Company of Moline Ill. It is thus instructive to describe adoption of such a harvesting unit set up for nominally 30 inches between individual row units to one with nominally 15 inches between individual row units.

The John Deere corn-picking head is an example of one type of corn picker not adjustable to 15 inches between individual row unit centers. Similar to the units described above, the Series 40 pickers use individual row units 26 with gear cases 34, roll unit frames 40, gathering chains 46, stalk rollers 38, and associated parts for units similar to the X-type units described above. In typical usage, the individual row units X are set at nominally 30 inches to accommodate 30 inch rows of crop. Although adjustable, units of this type generally cannot be adjusted for rows as close as 15 inches. The current invention allows existing 30 inch on-center harvesting units to be modified to 15 inch on-center units. In converting a Series 40, an additional Y-type individual row unit is installed between each existing X-type unit. Row dividers, including gatherer chain shields 32 and snooters 30, and outer gatherer shields 108 are also replaced.

In such a conversion, each existing (i.e., X-type) row unit frame 40 should have flat metal plates 110, preferably 12-gauge minimum cold rolled steel, attached to each side and extending to the adjacent row unit frames 40. These plates are connected to the existing row unit frames 40 by conventional structure, such as bolting or the like. Trash knives 45 are also attached to the side edge of existing frames 40 so that they operate with the stalk rollers 38 of a Y-type unit as best seen in FIG. 2. As seen in FIG. 2, new Series 40 intermediate gear cases 60 are installed between existing individual row units, complete with stalk rollers 38 attached. On a Series 40 unit, the dust covers of intermediate gear cases 60 are replaced with dust plugs configured to allow the row units to be placed on 15 inch centers. The additional gear cases 60 so added are mounted in the same manner as existing gear cases 34 and are driven from existing drive shaft 36 as shown in FIG. 8. At the center of a Series 40 corn-picking head, an extension to drive shaft 36 may be made by conventional means to power the centermost new individual row unit 26.

As seen advantageously in FIG. 5, on the added gear cases 60 gatherer drive shaft extensions 64, nominally 3 inches long and configured the same as existing shaft, are added to extend the shafts through raised deck assembly 66. These shafts preferably are configured to accept existing Series 40 drive sprockets 44 and may require a clearance groove nominally ½ radius to be machined in adjacent row unit frames 40. Raised deck assembly 66 is supported by adjacent row frames 40. The depth of throat plates 69 is controlled by the height of spacers 70 and 72. The new raised deck assembly 66 overlaps existing adjacent (X-type) individual row units 26. Preferably the new raised deck assembly 66 is thus supported to clear existing gatherer chains 46 by approximately ½ inch. Throat plates 69, as seen in FIG. 4, will preferably form a slot for ear passage about 2¾ inches deep by 1⅞ inches at the base. Ear guards 84 should be added to the rearward portion of deck 66. Gatherer chains 46 and associated drive gears 44, idler gears 48, tensioners 50 and the like are then installed as described herein for complete operation of the new individual row unit.

The existing Series 40 gatherer shields, snooters, and end shields are discarded as they will not accommodate the closely-spaced row units. As seen to advantage in FIG. 8, new uneven-leg gatherer chain shields 32 are installed. On the Series 40 modification, such a shield is advantageously 43 inches long with one leg of 4⅞ inches and a leg of 8⅛ inches. The rearward support post 94 for the shield is 5 inches long and offset 15 degrees from vertical away from the center line of the raised deck 66. The shield attaching structure 112 is preferably a cap nut or the like to present a catch-free surface to prevent a buildup of crop. An end cap (not shown) is preferably applied to the rearward end of the chain shield 32 to prevent debris from entering under the shield. The forward end of the chain shield 32 is hingably supported from hinge plates 92 attached to the forward end of the existing roll unit frames 40. Hinge plates 92 also serve as a common hinge point for new snooter 30. Snooter 30 advantageously extends forwardly approximately 20 inches from its hinge point to its tip; the equivalent dimensions on a Series 40 unit being approximately 41 inches. This reduced length enhances saving downed crop as discussed above and, also, aids in maneuvering the combine around the fields and the like due to the shorter extended length. This snooter length forms an angle between the ground and top of the snooter of about 25 to 35 degrees. Ear saver and adjustment features and the like discussed herein are incorporated into a Series 40 conversion. New end gatherer shields 108 are configured and mounted similarly to the gatherer chain shields 32 to complete the Series 40 conversion.

It will be apparent to one skilled in the art that in referring to 15 inch on-center spacing of row units, that reasonable adjustment around that figure is included, generally from about 12 inches to about 20 inches on-center. Further, from the foregoing, it will be seen that this invention is one well adapted to attain all the ends and objects hereinabove set forth together with other advantages which are obvious and which are inherent to the structure.

Figure 14:
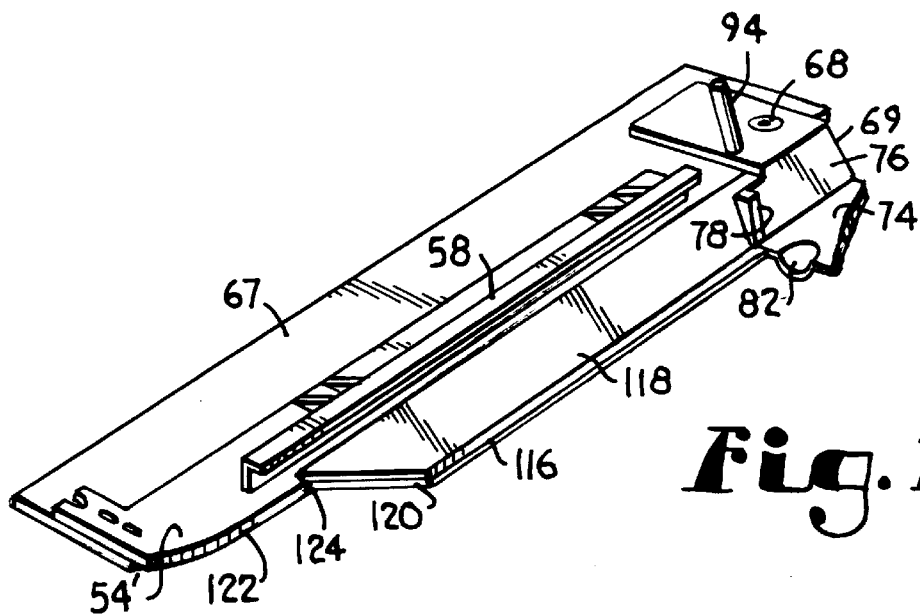
FIG. 14 is a fragmentary top perspective view of an alternative deck assembly of the present invention, one side of the deck assembly shown, the other side being a mirror image thereof.
Figure 15:
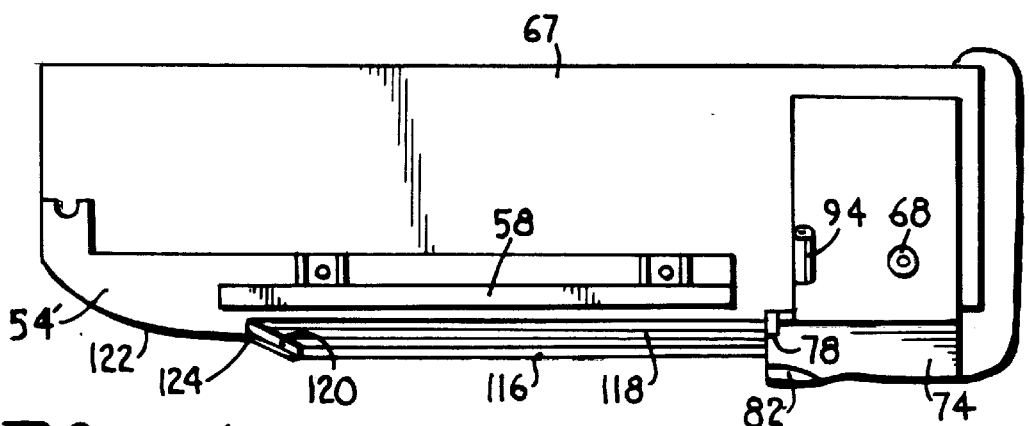
FIG. 15 is a fragmentary top plan view of the alternative deck assembly shown in FIG. 14.
Figure 16:
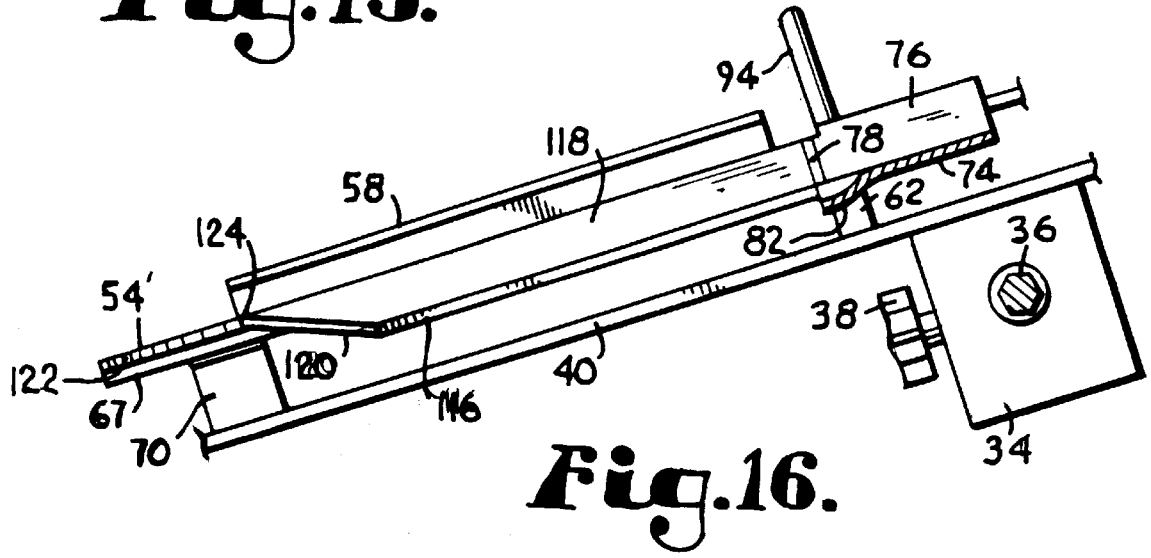
FIG. 16 is a view similar to FIG. 6 showing the alternative deck assembly in its operating position.

With reference to FIGS. 14–16, an alternative deck assembly is shown. This deck assembly is particularly well suited for instances where the crop being harvested is green or wet. Generally, the alternative deck assembly is the same as the deck assembly shown in FIG. 4, except for the modification of deck plates 54' to include a lowered horizontal section 116 and a slanted side wall 118. With reference to FIG. 14, the transition from plate 54' to horizontal section 116 is accomplished via an angled segment 120. Section 116 generally runs from the rearward end of segment 120 and can be connected to and adjacent to bottom plate 74. Wall 118 is also used to connect section 116 with plate 54' and also runs generally from side plates 76 all the way to the forward portion of segment 120. As is apparent, wall 118 has a pointed section in its forward end which is used to connect segment 120 to plate 54. In FIGS. 14–16, only one modified plate 54 is shown, the other modified plate being positioned on the other leg section 67 of the deck section and being a mirror image of the deck plate shown.

Alternative deck plate 54' can be modified from original plate 54 by making a cut inward from edge 122 of plate 54 from a point 124, and thereafter bending the cut portion downwardly to form segment 120 and section 116. Thereafter, a wall 118 will have to be positioned in place, for instance, by welding or other suitable attachment means.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

I claim:

1. A row crop harvester for mounting on the front of and powered by a combine, comprising:
    a frame suitable for mounting on a combine;
    an auger extending across the frame for conveying crop to a combine feeding location;
    a plurality of row units disposed in a parallel side-by-side relation, said row units including units of a first type and a second type, each said row unit comprising forwardly directed means for gathering the crop and means for separating unwanted portions of a crop, and wherein said second type row units are parallel to and vertically offset from said first type row units so as to allow said row units to be placed in a parallel close side-by-side relationship without portions of each interfering with each other, and wherein each crop gathering means includes a forward end and a rearward end, said rearward ends discharging crop portions to said auger and positioned in a line generally parallel to said auger.

2. The crop harvester of claim 1, wherein said crop gathering means is comprised of a pair of crop gathering chains disposed side by side and in the same plane, and wherein the plane of the crop gathering chains on said second type of harvesting unit is displaced vertically from the plane of chains on said first type of crop harvesting unit.

3. The crop harvester of claim 1, wherein the horizontal spacing between adjacent row units is from about 13 inches to about 20 inches.

4. The crop harvester of claim 1, further comprising means disposed between adjacent row units and for dividing crop rows, wherein said dividing means is arranged to urge crop rows toward said row units, and wherein said dividing means is hingeably connected to said row units.

5. The crop harvester of claim 4, wherein said dividing means has a forwardly projecting portion which forms an angle of from about 25 to about 35 degrees from a horizontal plane.

6. A corn harvester for mounting on the front of and powered by a combine, comprising:
    a frame suitable for mounting on a combine;
    an auger extending across the frame for conveying crop to a combine feeding location;
    a plurality of row units for corn harvesting, said row units disposed in a parallel side-by-side relationship transverse to the front of the combine, and spaced and oriented for receiving a plurality of transversely spaced rows of corn, each said row unit having a pair of rotatably driven harvesting rollers and driven gathering chains, and wherein said row units include row units of a first type and row units of a second type, said row units disposed so that said second type of row unit is disposed between and parallel to said first type of row units so that said first and second type of row units alternate across said front of said combine, and wherein said driven gathering chains on said second type of row unit are displaced vertically from a horizontal plane of said gathering chains on said first type of row unit, and further wherein each of said driven gathering chains follows an oblong path with a front end, and a rear end, said rear ends discharging crop portions to said auger and positioned in a line generally parallel to said auger.

7. The corn harvester of claim 6, further comprising means disposed between adjacent row units and for dividing crop rows, wherein said dividing means is arranged to urge crop rows toward said row units, and wherein said dividing means is hingeably connected to said row units.

8. The corn harvester of claim 6, wherein the horizontal spacing between adjacent row units is from about 13 to about 20 inches.

* * * * *